United States Patent [19]

Fleischer et al.

[11] 4,117,903
[45] Oct. 3, 1978

[54] VEHICLE SPEED CONTROL SYSTEM

[75] Inventors: Helmut Fleischer, Schwieberdingen; Erich Schneider, Kirchheim, both of Germany

[73] Assignee: Robert Bosch GmbH, Stuttgart, Germany

[21] Appl. No.: 770,595

[22] Filed: Feb. 22, 1977

[30] Foreign Application Priority Data

Mar. 10, 1977 [DE] Fed. Rep. of Germany ....... 2609867

[51] Int. Cl.² .............................................. B60K 31/00
[52] U.S. Cl. ................................. 180/105 E; 123/102
[58] Field of Search ........................ 180/105 E; 317/5; 123/102

[56] References Cited

U.S. PATENT DOCUMENTS

| 3,715,006 | 2/1973 | Walsh | 180/105 E |
| 3,766,367 | 10/1973 | Sumiyoshi | 180/105 E X |
| 3,885,137 | 5/1975 | Ooya | 180/105 E X |

Primary Examiner—Joseph F. Peters, Jr.
Assistant Examiner—Terrance L. Siemens
Attorney, Agent, or Firm—Flynn & Frishauf

[57] ABSTRACT

To decrease the number of switches and their connections to a speed control system, only two manually operated switches are provided to, respectively, allow for "engage", "disable" and "resume" operations, the system further including a bistable circuit which is connected to one of the manually operated switches to provide tne manually operated switch with a dual function.

10 Claims, 3 Drawing Figures

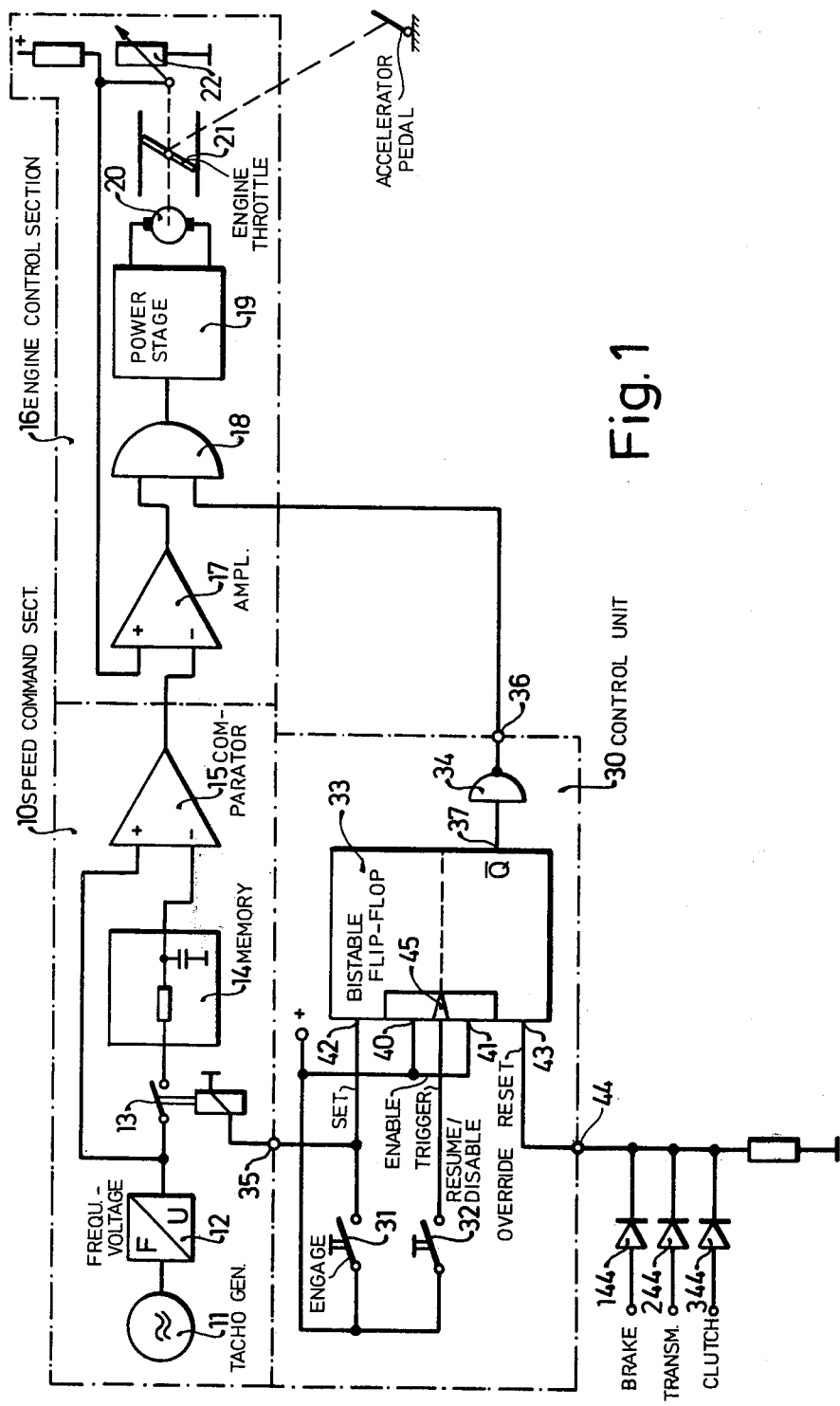

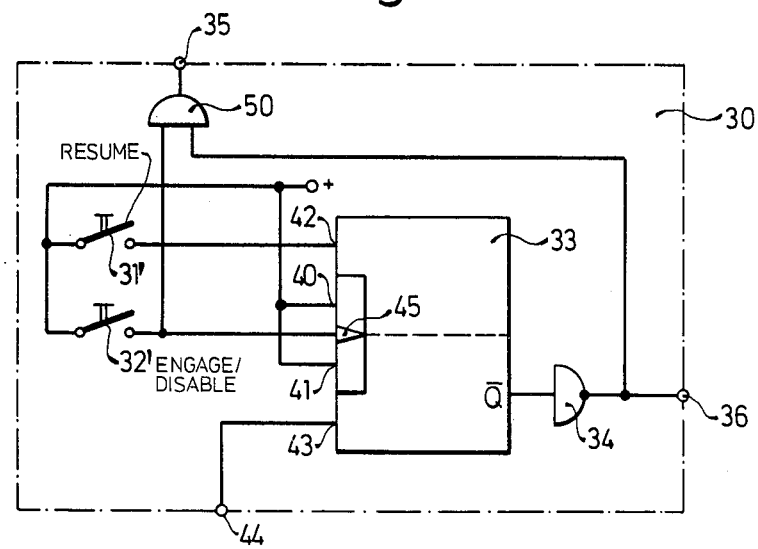
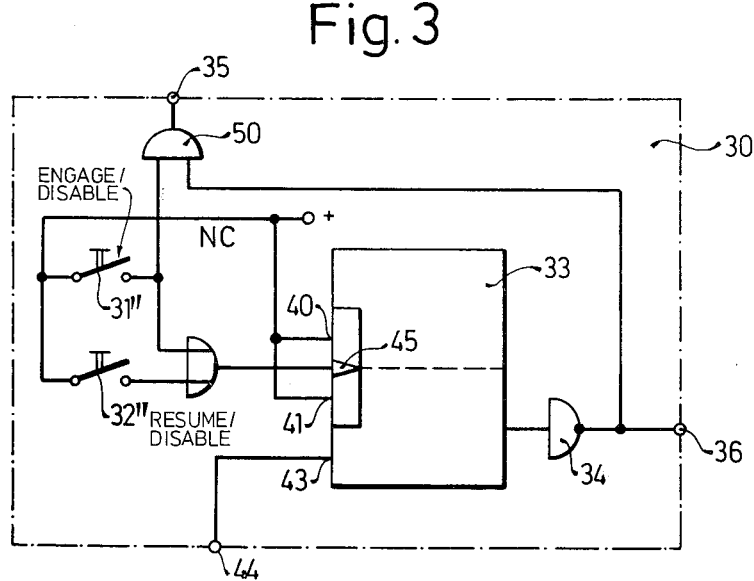

VEHICLE SPEED CONTROL SYSTEM

Cross reference to related applications: U.S. Ser. No. 770,585, filed Feb. 22, 1977, Fleischer U.S. Ser. No. 770,594, filed Feb. 22, 1977, Fleischer both assigned to the assignee of the present invention.

The present invention relates to a vehicle speed control system and more particularly to such a system in which a signal is derived representative of actual vehicle speed which is compared with a signal entered into a memory to store a commanded speed value, and in which a comparison of the commanded and actual speeds is used to generate an error signal which controls the positioning element.

Various vehicular speed control systems have been proposed; usually they require manually operated switches. One switch is used to connect the system, which may be termed a "engage" switch; a further switch is used to disconnect the system which may be termed a "disable"; and the third switch is used to store a value representative of a commanded, for example to set a memory upon simultaneous engagement of the system to store, in the memory, the then instantaneous speed. The system is not entirely appropriate to operating requirements and comfort; further, difficulties arise in locating the necessary switches close to the steering wheel, or in combination with a steering post switch, or switches mounted on the steering post, or a housing, or cowling therefor.

It is an object of the present invention to provide a control system having a minimum of units or elements having control functions, so that the system will be simple, while still permitting comfortable and convenient operation of the speed control system, and which is so arranged that it can be made to form original equipment of the vehicle, as well as a subsequently added accessory.

SUBJECT MATTER OF THE PRESENT INVENTION

Briefly, the control unit for the speed control system has only two manually operated switches, preferably touch controlled switches, and further includes a bistable circuit connected to at least one of the switches so that one of the switches, at least, can function as a dual-mode operating switch.

The number of manually operable switches, and thus the requirements for space as well as assembly, wiring, and the like can be reduced if at least one of the manually operated switches can be used to carry out more than one switching function, by alternative, or successive operation of the same switch.

In accordance with a feature of the invention, one of the switches has associated therewith the function of setting a memory while simultaneously enabling the positioning system; the other switch has the sole function of engaging the positioning system, for example to resume a speed already set in the memory, as well as to disconnect the positioning system.

The bistable circuit can be used in the form of a suitable stepping circuit, stepping from one position to another; in accordance with a feature of the invention, however, the bistable circuit is a T-flip-flop having a trigger input connected to the one, or both of the operating buttons which have to have a dual function and having another input connected to one of the other manually operated switches, unless the manually operated switches are both connected to the trigger input.

This pure electronic arrangement is less subject to malfunction and error, as well as being considerably less expensive than a mechanical stepping network.

It is a comparatively simple matter to integrate automatic disconnect functions in the system of the present invention. Thus, and in accordance with a feature thereof, suitable switching signals can be applied directly to an input of the T-flip-flop to disable automatic positioning. Applying disconnect signals directly to inputs of the flip-flop which act directly on the output has the advantage that these signals can be arranged to provide priority of function or operation, that is, overide the manually inserted information into the flip-flop. This is important to provide for reliability of disengagement of the automatic speed control system if, for example, the brake or the clutch of the vehicle is operated, so that the positioning system is reliably disconnected and remains disconnected upon brake or clutch operation, even if one or the other or both of the manually operated switches are operated by the driver.

It has previously been proposed to disconnect the positioning system by interrupting power supply to the final stage. In accordance with a feature of the invention, the final stage is disabled by controlling an amplifier therefor, preferably through a controlled gate. This decreases costs of the system since the power to be switched is substantially less.

The invention will be described by way of example with reference to the accompanying drawings, wherein:

FIG. 1 is a general block circuit diagram of a vehicle speed control system illustrating a first embodiment of the invention:

FIG. 2 is a fragmentary circuit diagram of a portion of the system of FIG. 1 and illustrating another modification;

and FIG. 3 is another fragmentary diagram illustrating a third embodiment.

Block 10 (FIG. 1), in general includes the portions of the system to control the speed of the vehicle and therefore forms the speed command section thereof; block 16 is the actual engine control section which forms the positioning unit for the throttle of the engine, and block 30 is the control unit therefor. FIGS. 2 and 3 illustrate modification of the control unit, that is, of block 30, the remainder of the system being unchanged.

The speed command section 10 (FIG. 1) has a tachometer generator 11 the output voltage of which is converted in a frequency-voltage converter to a dc voltage representative of vehicle speed. This voltage can be stored in a memory 14 upon closing of a relay switch contact 13 as a speed command value if relay 13 is closed when the vehicle has reached a desired speed. The output of the memory 14, forming a command signal, is compared with the instantaneous actual vehicle speed signal in a comparator 15 to provide an error positioning signal for the engine control section 16.

The engine control section 16 includes an amplifier 17 in the form of an operational amplifier, the output of which is connected through an AND gate 18 to the power output stage 19. The output of the power stage 19 controls a motor 20 which, in turn, is mechanically coupled to the engine throttle 21 controlling fuel flow to the engine. The engine throttle is coupled to the accelerator pedal of the vehicle. The actual position of the engine throttle 21 is sensed by a sensing potentiometer 22 which provides a voltage depending on the angle of the throttle position. This voltage is applied to the amplifier 17 as an actual throttle position signal, so that the engine control section operates as a closed loop servo system.

The control unit 30 has two pushbutton or touch sensitive switches 31, 32, and a bistable network 33 constructed as a J-K flip-flop with a trigger input. The output of the flip-flop (FF) 33 is connected through an inverter 34 to terminal 36 of the control unit and then to an AND gate 18. The control unit has a speed set output terminal 35 which is connected to the switch 13.

The T-FF is a JK-FF having "enable" inputs 40, 41 connected to the positive terminal of a source of voltage supply, for example a regulated voltage derived from the battery of the vehicle. The FF 33 additionally has two inputs 42, 43 which directly effect the output of the FF. These are the customary SET and RESET terminals 42, 43. The RESET input 43 is controled directly from a terminal 44 and then by an OR gate formed by diodes 144, 244, 344 to have automatically derived disconnect signals applied thereto. The terminal 43 is an overide terminal, and enabling terminal 43 overides any other input signals. This is desirable because, if the brake of the vehicle is operated, or if the clutch is disengaged or the transmission is placed in neutral, the positioning system must be immediately disconnected so that it does not counteract action of the brake, or interfere with transmission changing due to excessive engine speed. The T-FF 33 has an additional trigger input 45 which in the example illustrated reacts to positive flanks of trigger pulses.

The embodiment of FIG. 1 illustrates the arrangement in which the manually operable switch 31 provides for setting of the memory and simultaneous engagement of the positioning system; the manually operable switch 32 has a dual function which, alternatively, can effect disabling of the positioning system or resumption of automatic control by the positioning system.

Operation: Let it be assumed that the system is not in operation, but that the vehicle with which it is associated is being driven along a highway. The driver accelerates the vehicle by depressing the accelerator pedal which changes the position of engine throttle 21. When the desired speed, as indicated by the speedometer has been reached, the driver operates switch 31. This operation need only be momentary. This causes response of the switch 13 and the voltage representing the then instantaneously existing speed will be stored in memory 14 by storing the dc voltage, as converted from the tachogenerator 11 by the voltage frequency converter 12 in the memory circuit 14. Upon operation of switch 31, FF 33 is simultaneously SET. The voltage at the output 37 of the FF 33, taken at the inverting side, drops to a value near ground, or chassis potential. Inverter 34 raises the voltage to a predetermined level, responding to a binary ONE signal level, which appears at output 36, and thereby enables AND gate 18. Amplifier 19 is thereby enabled to control motor 20 to position the engine throttle, as indicated schematically by the broken line between motor 20 and throttle 21. The positioning system is in operation and will hold the vehicle at a constant speed.

Operation of switch 32 applies a signal to trigger input terminal 45 which changes over the state of FF 33 to RESET state, so that the output 37 will have operating potential appear thereat. Due to the action of the inverter 34, gate 18 is blocked and the positioning system disconnected. Subsequent operation of the switch 32, forming a "resume" operation again changes the state of FF 33 to SET state, again opening gate 18. Since, however, the stored speed command value has not changed, the vehicle will be accelerated to the previously commanded speed, or, respectively, no fuel will be supplied to permit engine braking to slow the vehicle.

The switch 32 thus has a dual function; alternatively it enables and disables the power stage 19 and hence the positioning motor 20 for alternative ON and OFF operation of the positioning system with respect to a previously commanded speed.

If switch 31 is operated while the positioning system is engaged, that is, gate 18 is open, no change will be effected by the FF 33; a new speed can be commanded, however, by storing a new speed in memory 14.

If, at any time, during operation of the system the brake is operated, diode 144 will be rendered conductive and a signal will be applied to the override — RESET terminal 43 which is directly transfered to the output 37 of the FF 33. This signal, which is a priority signal, casuses immediate disconnection of the positioning portion of the engine control section, that is, disconnection of the input to the power stage 19 and hence disabling of the motor 20. No operation of any one of the switches 31, 32 can override the RESET signal on terminal 43. If both terminals 42 and 43 have a signal applied thereto, the terminal 43 has priority and a high, or ONE output will be obtained at terminal 37.

Application of a signal to any one of the other diodes 244, 344, or further similarly connected diodes will, likewise, effect immediate disconnection of the power stage and hence of the positioning system. The power stage is disabled at its input, so that the switching power required is low.

Embodiment of FIG. 2: The only difference in this system is the specific connection of the control unit 30', which has output terminals corresponding to those of control unit 30 and which therefore has been given the same numbers and are similarly connected to the remaining sections and elements of the system. Operation of switch 31' only enables the engine control section by providing a ONE signal at terminal 36, thereby enabling gate 18. Memory 14 is set upon operation of the switch 32', which operates a dual function switch. Insurance must be provided that the memory can be set only if, simultaneously, the positioning system is in operation. This is obtained by controlling engagement of switch 13 over an AND gate 50 which is controlled by the switch 32 only if, simultaneously, the output 36 has a ONE signal appear thereat.

Embodiment of FIG. 3: Both momentary operating switches 31" and 32" are dual-function switches. The switch 31" alternatively sets the memory 14 upon simultaneous connection of the positioning system and disabling the positioning system. The switch 32 alternatively connects or disconnects the positioning system.

Various change and modifications may be made within the scope of the inventive concept.

We claim:
1. Vehicle speed control system having
   a vehicle speed transducer (11, 12) providing an actual vehicle speed signal;
   a memory (14) to store a commanded vehicle speed providing a command vehicle speed signal;
   operator means (15) comparing the commanded and actual speed signals and providing a control output signal;

means (16, 20) providing a control positioning output to affect the speed of operation of the engine of the vehicle;

and a control unit (30) connected to the memory (14) and to the positioning means (16, 20) including manually operable switch means (31, 32; 31', 32'; 31", 32") providing switching signals to, respectively, command enabling or disabling of the memory and enabling or disabling of the positioning means wherein, in accordance with the invention the control unit (30) comprises only two manual operable switch means and further comprises a bistable circuit (33), the operating state of the bistable circuit being controlled by at least one of the manually operable switch means and said bistable circuit (33) being connected to control enabling and disabling of the positioning means (16, 20).

2. System according to claim 1 wherein one of the manually operable switch means is connected to engage the memory (14) upon simultaneous energization of the positioning means (16, 20), and the other switch means is connected to engage the positioning means (20);

and wherein disengagement of the positioning means (20) is effected by operation of at least one of the switch means.

3. System according to claim 1 wherein the bistable circuit (33) comprises a trigger-enabled flip-flop (FF) (33) having a trigger input (45), at least one of the switch means being a dual function switch means (32), the trigger input (45) being connected to said at least one dual function switch means, the FF (33) having an input (42) directly affecting the output of the FF, said directly affected output being connected to the other switch means.

4. System according to claim 3 further comprising an OR gate having its inputs connected to both the switch means (31", 32") and its output connected to the trigger input (45) of the FF (33).

5. System according to claim 1 further comprising logic circuit means (50) connected to the output of the FF (33) and to the input of the memory (14) and permitting enabling of the memory only if the FF (33) is in a predetermined state, and inhibiting setting of the memory when the FF (33) is in another state.

6. System according to claim 1 wherein the FF (33) has a priority input terminal (43) providing for establishing the state of the FF (33) to disconnect the positioning means upon enabling of the priority terminal;

and means (144, 244, 344) providing priority disconnect inputs to said priority terminal to cause immediate disabling of the positioning means (16, 19, 20) when said terminal is enabled.

7. System according to claim 1 wherein the positioning means (16, 20) includes a power stage (19);

and further comprising a logic stage (18) connected to the input of a power stage and having its state controlled by the output from the FF (33), whereby the positioning means is controlled at the input to the power stage and at a low power level thereof.

8. System according to claim 1 wherein one of the manually operable switch means (31) is connected to place the FF (33) in a first state, the output of the FF (33) in said first state enabling the positioning means, and simultaneously enables the memory (14);

and the other switch means (32) is connected to another input (45) of the FF (33) and forms a "disable/resume" switch which, upon a first operation, resets the FF (33) to disengage the positioning means (16, 20) by changing the FF (33) to its other state, and upon subsequent operation reconnects the positioning means (16, 20) by changing the FF (33) again to said first state.

9. System according to claim 8 wherein said other terminal is a trigger input terminal (45) of the FF (33).

10. System according to claim 9 wherein a priority override reset input terminal (43) is connected to the FF (33) to change it over to said other state and thereby effect disconnection of the positioning means (16, 20), said override reset input overriding any other inputs at any other input terminals of the FF (33);

and means (144, 244, 344) providing priority override reset signals to said override reset terminal.

* * * * *